United States Patent [19]

Cavezzan et al.

[11] Patent Number: 5,019,644
[45] Date of Patent: May 28, 1991

[54] PHOTOCURABLE DIORGANOPOLYSILOXANES CONTAINING THIOALKYL (METH) ACRYLATE FUNCTIONAL GROUPS

[75] Inventors: Jacques Cavezzan, Villeurbanne; Edith Cavinenc, Lyons, both of France

[73] Assignee: Rhone-Poulenc Chimie, Courbevoie, France

[21] Appl. No.: 386,268

[22] Filed: Jul. 28, 1989

[30] Foreign Application Priority Data

Jul. 29, 1988 [FR] France .................................. 88 10532

[51] Int. Cl.$^5$ ............................................... B32B 9/04
[52] U.S. Cl. ........................................ 428/447; 528/28; 528/18; 528/32; 528/29; 528/26; 556/427
[58] Field of Search .................... 528/28, 18, 32, 29, 528/26; 556/427

[56] References Cited

U.S. PATENT DOCUMENTS

| | | | |
|---|---|---|---|
| 4,725,630 | 2/1988 | Magee et al. | 556/427 |
| 4,906,718 | 3/1990 | Gornowicz et al. | 528/32 |
| 4,940,766 | 7/1990 | Gay et al. | 528/26 |

*Primary Examiner*—Melvyn I. Marquis
*Assistant Examiner*—Margaret Glass
*Attorney, Agent, or Firm*—Burns, Doane, Swecker and Mathis

[57] ABSTRACT

Linear and cyclic diorganopolysiloxanes containing thioalkyl (meth)acrylate functional groups bonded via an SiC linkage to the polysiloxane backbone are crosslinkable under the influence of UV or an electron beam, and thus are well suited, e.g., for the sheathing of optical fibers.

12 Claims, No Drawings

PHOTOCURABLE DIORGANOPOLYSILOXANES CONTAINING THIOALKYL (METH) ACRYLATE FUNCTIONAL GROUPS

BACKGROUND OF THE INVENTION

1. Field of the Invention

The present invention relates to novel diorganopolysiloxanes comprising pendant thioalkyl (meth)acrylate functional groups bonded via an SiC bond to the polysiloxane backbone, to a process for its preparation of such novel diorganopolysiloxanes, and to their use for the sheathing (coating) of optical fibers.

2. Description of the Prior Art

The demand in this art for organopolysiloxanes having acrylate and/or methacrylate functional groups bonded via an SiC bond to the polysiloxane backbone is greatly increasing, because the polymer crosslinks faster than the commercially available vinylated organopolysiloxanes. Such organopolysiloxanes containing acrylate and/or methacrylate functional groups are generally in the form of diorganopolysiloxane oils and can be formulated either alone or in combination with unsaturated monomers or polymers, to be subsequently crosslinked, generally under the influence of UV radiation.

Thus, U.S. Pat. No. 3,577,264 describes film-forming paint binders including such oils that can be crosslinked under the influence of radiation. U.S. Pat. No. 4,035,355 describes the crosslinking of such oils in an anaerobic medium. European Patent EP-A-016,663 describes their use as an adherent coating. British Patent GB-A-949,126 describes hydrolyzable silanes employed as adhesion promoters for reinforcing materials made of glass fibers, certain of these silanes being prepared by hydrosilylation of allyl methacrylate.

However, it is well known to this art that the hydrosilylation of compounds containing an allyl substituent in the presence of a platinum catalyst can present undesirable secondary reactions, particularly resulting in the formation of propene, unless the silicon hydride contains electron-donating groups such as chlorine atoms or carbonyl groups. In this regard, see J. L. Speier et al, *J. Am. Chem. Soc.* 79. 51957 (1974) and I. W. Ryam et al, *J. Am. Chem. Soc.*, 82, 3601 (1980) and U.S. Pat. Nos. 4,503,208 and 3,767,690.

U.S. Pat. Nos. 4,011,247 and 4,554,339 describe diorganopolysiloxanes bearing both acrylyloxy units and SiH functional groups.

According to U.S. Pat. No. 4,554,339, oils which are gamma-hydroxypropylated at the end of the polymer chain are esterified with acrylic acid in the presence of an acidic earth of the montmorillonite type. This particular process presents the disadvantage of having to separate the solid catalyst upon completion of the reaction.

U.S. Pat. Nos. 4,261,875 and 4,294,974 describe a process for the preparation of diorganopolysiloxane oils having acrylate and/or methacrylate functional groups, and also hydroxyalkyl functional groups, by reacting the corresponding diorganopolysiloxane oil comprising hydroxyalkyl functional groups with acryloyl or methacryloyl chloride in the presence of triethylamine and with formation of the corresponding amine hydrochloride. The principal disadvantage of such a technique is in the necessity for removing the amine hydrochloride formed.

Another monomer which is also widely used is 2-isocyanatoethyl methacrylate (U.S. Pat. Nos. 4,543,398 and 4,600,751).

However, this monomer is sensitive to the presence of water and thus presents unavoidable toxicity hazards.

It is also possible to prepare oils containing an acrylate or methacrylate functional group by opening an epoxy (oxirane) ring using acrylic acid in the presence of a wide variety of catalysts (U.S. Pat. No. 4,293,678 and EP-A-269,114). Thus prepared are, for example, diorganopolysiloxanes comprising groups of the formula:

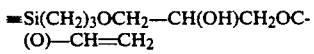

The oils produced are frequently very viscous because of the presence of hydroxyl groups which result in the formation of hydrogen bonds.

The reaction is also incomplete. Residual epoxy groups are often retained, and are less susceptible to UV radiation than acrylate groups. In addition, these oils display but mediocre storage stability.

U.S. Pat. No. 3,767,690 describes the preparation of organosilicon cinnamates by reacting allyl cinnamates with a silane or siloxane containing a mercapto functional group. The compounds produced crosslink under UV radiation, but much more slowly than the diorganopolysiloxanes containing acrylate or methacrylate functional groups. This process cannot be extrapolated to the preparation of diorganopolysiloxanes containing a thioalkyl acrylate functional group because it requires free-radical generators which polymerize the acrylate or methacrylate functional groups.

Furthermore, for such highly specific applications as the sheathing of optical fibers, silicone compositions are required having a high refractive index (higher than 1.48) for the primary coating of the optical fibers, and also having a high Young's modulus (higher than 100 MPa) for the secondary coating of the optical fibers.

In addition, these silicone compositions must be crosslinkable under gamma, UV, electron beam and similar radiations, in an irradiation time of less than one second.

The known diorganopolysiloxanes containing an acrylate functional group generally crosslink well in less than one second, but have a refractive index which is generally lower than 1.48 and a Young's modulus which is frequently lower than 100 MPa.

SUMMARY OF THE INVENTION

Accordingly, a major object of the present invention is the provision of novel diorganopolysiloxanes comprising (meth)acrylate functional groups bonded via SiC bonds to the polysiloxane backbone, which novel diorganopolysiloxanes are easily prepared from readily available starting materials, are stable in storage, are curable under gamma, UV, infrared or electron beam radiation, in a thin layer, in less than one second, have a refractive index higher than 1.48, and have a Young's modulus higher than 100 MPa in the crosslinked state.

Briefly, the present invention features novel diorganopolysiloxanes having the formula (1):

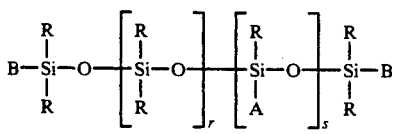
(1)

in which the symbols R, which may be identical or different, are each a $C_1$-$C_{10}$ alkyl, vinyl, phenyl or 3,3,3-trifluoropropyl radical, at least 80% of the number of the radicals R being methyl radicals; the symbols B, which may be identical or different, are each a radical R or a radical A defined below; r is an integer ranging from 0 to 200, inclusive; and s is an integer ranging from 0 to 50, inclusive, with the proviso that, if s is 0, at least one of the two symbols B is A; and having the formula (2):

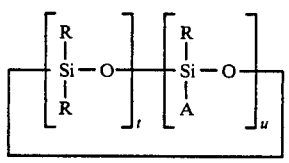
(2)

in which R is as defined in formula (1); u is an integer ranging from 1 to 20; t is an integer ranging from 0 to 20, inclusive; the sum t+u is equal to or greater than 3; and in which formulae (1) and (2) the symbols A, which may be identical or different, are each a radical having one of the formulae:

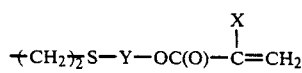
(3)

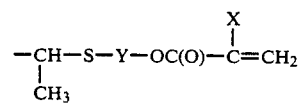
(4)

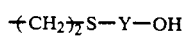
(5)

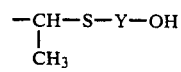
(6)

wherein X is a hydrogen atom or a methyl radical, at least one of the radicals A has the formula (3) or (4), and Y is a linear or branched chain divalent saturated aliphatic hydrocarbon radical containing from 2 to 10, preferably 2 to 4 carbon atoms.

DETAILED DESCRIPTION OF THE PREFERRED EMBODIMENTS OF THE INVENTION

More particularly according to the present invention, random or block polymers of the formulae (1) and (2) exhibiting at least one of the following characteristics are the more preferred:
R is a methyl, phenyl or vinyl radical;
r ranges from 0 to 20, inclusive;
s ranges from 2 to 15, inclusive;
t+u ranges from 3 to 10;
X is methyl; and
Y is —(CH$_2$)$_2$—.
All of the radicals A preferably have the formulae (3) and/or (4).

In a preferred embodiment of the invention, the polymers of formulae (1) and (2) may be prepared by first reacting a diorganopolysiloxane having the formula (7):

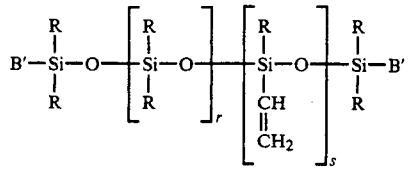
(7)

in which R, r and s are as defined above in respect of formula (1) and the radicals B', which may be identical or different, are each a radical R or a vinyl radical; or a diorganopolysiloxane having the formula (8):

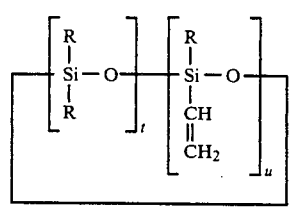
(8)

in which R, t and u are as defined above in respect of formula (2), with a mercaptoalkanol of the formula HSYOH, wherein Y is as above defined, in the presence of a free-radical generator; and, in a second stage, reacting the polymer containing a mercaptoalkanol functional group thus produced with an acrylic acid ester of the formula:

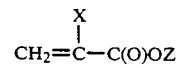
(9)

in which X is a hydrogen atom or a methyl radical and Z is an alkyl radical, in the presence of a catalytically effective amount of a tin compound.

The first stage of the process entails a reaction of radical addition of a mercaptoalkanol to an organosilicon vinyl compound in the presence of a free-radical generator, advantageously azobisisobutyronitrile.

A reaction of this type is known to the art; it is described, for example, in European Patent EP-A-0,229,390.

A polymer principally containing groups of formula (5) and possibly (6) is produced by this reaction.

The mercaptoalkanol can be reacted in a molar deficiency, a molar excess or an equimolar quantity relative to the number of moles of the vinyl moiety in the starting polymer of formula (7).

Using a molar deficiency of mercaptoalkanol enables the preparation of an oil of formula (1) containing residual vinyl radicals along the polymer backbone.

2-Mercaptoethanol, 1-mercapto-3-propanol and 3-mercapto-2-butanol are exemplary of the mercaptoalkanol.

In the event that a complete reaction is desired, it is recommended to employ a molar excess of mercaptoalkanol. The excess mercaptoalkanol is removed, for example, by distillation under reduced pressure. The addition reaction preferably is carried out under heating (60° to 110° C.) for a period of two to several hours.

During this addition reaction, the addition reaction can take place in the α- or β-position relative to the silicon atom bearing the vinyl group, and groups of the above formula (6) are then produced in the diorganopolysiloxane chain.

The starting polymers of formulae (7) and (8) are well known to this art and are described in detail in the literature. In addition, most are commercially available.

The transesterification reaction of the second stage is described in detail in published French Patent Application 87/02,617, filed Feb. 24, 1987, and assigned to the assignee hereof.

During the transesterification reaction, the alcohol formed, having the formula ZOH, is removed, preferably continuously by azeotropic distillation with the ester of formula (9).

The tin catalyst may be any inorganic and/or organic tin compound. It is preferred, however, to employ compounds of tin of valency 4.

More particularly preferred are dialkyltin oxides in which the alkyl radicals are $C_1$-$C_{18}$, inclusive, such as di-n-butyltin oxide, di-n-octyltin oxide, di(2-ethylhexyl)tin oxide and the products of reaction of these dialkyltin oxides with organic esters such as dimethyl maleate and diethyl phthalate or alkyl silicates, such as methyl or ethyl silicate, as described in detail in U.S. Pat. Nos. 2,597,920 and 3,839,246 and British Patent GB-A-1,551,868.

All of the tin catalysts employed as catalysts for curing silicone elastomer compositions which are crosslinked by a polycondensation reaction can also be used. Thus, tin carboxylates can be used, such as dialkyltin dicarboxylates, in particular di-n-butyltin or di-n-octyltin dilaurate, di-n-octyltin or di-n-butyltin diacetate (see the text by Noll, *Chemistry and Technology of Silicones*, 2nd Edition, page 337, Academic Press (1968)), as well as dialkyltin diversatates (U.S. Pat. No. 3,678,002).

It is also possible to use the products of reaction of dialkyltin dicarboxylates with silicates, or the products of their partial hydrolysis, as described in French Patent FR-A-1,343,138 and U.S. Pat. Nos. 3,186,963 and 3,862,919, as well as the tin chelates described in U.S. Pat. No. 3,055,848 and European Patent EP-A-147,323.

The tin catalyst may be introduced at the same time as the reactants, or in small fractions over the course of the reaction.

The amount of catalyst used may vary considerably; it generally ranges from 0.001 to 2% by weight, preferably 0.01 to 0.5% by weight, of tin metal relative to the weight of the reaction mass.

The amount of the ester of formula (9) preferably ranges from approximately 1.1 to 5 moles of ester (9) per equivalent of alcohol functional groups present in the polymer containing a mercaptoalkanol functional group. However, a deficiency of ester can be used (or an incomplete transesterification can be carried out), if it is intended to have free alcohol functional groups remain.

The reactions in the two stages may be carried out in bulk or in an organic solvent medium, such as xylene or toluene.

Although the transesterification reaction in the second stage is the preferred reaction, the polymer containing a mercaptoalkanol functional group can be condensed directly with acrylic acid [formula (9), Z=H] or with the chloride of acrylic acid [formula (9), Z=Cl].

In an alternate embodiment, the polysiloxane chain of a diorganopolysiloxane of formulae (1) or (2) can be extended by conducting a rearrangement or polymerization reaction on this diorganopolysiloxane in the presence of a cationic catalyst such as trifluoromethanesulfonic acid and of a diorganopolysiloxane of the formula:

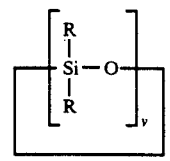

wherein R is as defined in respect of formula (1) and v is an integer ranging from 3 to 10, inclusive.

The polymerization and/or rearrangement reaction is terminated by adding a base, such as, for example, $Na_2CO_3$ or $NaHCO_3$.

The polymers of formulae (1) and (2) crosslink in the surrounding air or in an inert atmosphere in layers of a few μm to several millimeters in thickness in less than one second, on exposure to UV, an electron beam, gamma or infrared radiations, and the like.

The coating produced is transparent and has a high refractive index of more than 1.48 and a Young's modulus higher than 100 MPa.

The polymers of formula (1) may contain additives such as:
  (i) photoinitiators, such as acetophenone, benzophenone, anthraquinone, 4,4'-dimethoxybenzophenone and 2-hydroxy-2-methyl-1-phenyl-1-propanone;
  (ii) polymerization initiators such as organic peroxides;
  (iii) organic amines;
  (iv) polymerization inhibitors, such as hydroquinone;
  (v) reactive diluents, such as hexanediol acrylate, tripropyleneglycol diacrylate and trimethylolpropane triacrylate.

The polymers of formulae (1) and (2) are most especially suitable for formulation in compositions for sheathing optical fibers made of silica which are crosslinkable under the influence of UV or an electron beam.

The polymers according to the invention can also be employed for depositing a crosslinked film of elastomer onto various substrates, such as paper and polyethylene, and for producing in-situ seals which are crosslinkable under UV radiation.

In order to further illustrate the present invention and the advantages thereof, the following specific examples are given, it being understood that same are intended only as illustrative and in nowise limitative.

In said examples to follow, all parts and percentages are given by weight, unless otherwise indicated.

EXAMPLE 1

Synthesis of the tetramethylcyclotetrasiloxane comprising methacrylate functional groups and having the formula:

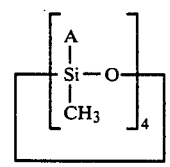

wherein A is principally —(CH₂)₂S(CH₂)₂—OC-(O)—C(CH₃)=CH₂:

(1a): Synthesis of the compound of the formula:

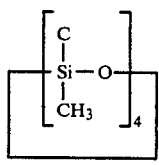

wherein C is principally —(CH₂)₂S(CH₂)OH, from vinylated D₄ of the formula:

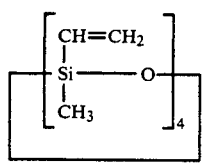

108.23 g of vinylated D₄ containing 1,162.8 meq of vinyl functional group per 100 g, and 200 mg of ABIBN (azobisisobutyronitrile) were charged into a three-necked round-bottom flask fitted with a stirrer, heated with a thermostated oil bath and under a stream of nitrogen.

The reaction mass was heated to 95° C. under stirring. 128.64 g of mercaptoalkanol were introduced such as to control the exothermicity of the reaction.

A change in color of the reaction mixture from colorless to pale yellow, and an increase in viscosity, were observed during the addition. After 3 hours of reaction, the degree of conversion of the vinyl groups was 83.5%.

Additional amounts of ABIBN, 100 mg and 60 mg, were added in succession to the reaction mixture to obtain a quantitative degree of conversion of the vinyl groups after 13 hours of reaction.

The excess mercaptoalkanol was removed at 130° C. at 2 kPa.

The residue obtained was a clear colorless oil.

A characterization using ¹H NMR at 360 MHz (d₆-DMSO) determined the following chain sequences:

| | |
|---|---|
| ≡Si—CH₂—CH₂—S(CH₂)₂—OH | 94.5 mol % |
| ≡Si—CH—S(CH₂)₂—OH<br>     \|<br>    CH₃ | 5.5 mol % |

Refractive index η_D²³°: 1.5240.

(1b): Synthesis of the tetramethylcyclotetrasiloxane comprising methacrylate functional groups:

36.28 g of the compound produced in Example (1a), 0.638 g of hydroquinone and 78.98 g of methyl methacrylate (MMA) were charged into a three-necked round-bottom flask heated with an oil bath at 110° C., equipped with a central stirrer and a vertical condenser and purged by a stream of nitrogen by bubbling into the reaction mixture.

When the temperature reached 60° C., 0.2423 g of dibutyltin oxide was added.

The reaction was carried out under stirring for 24 hours.

Upon completion of the reaction, the excess MMA was removed by distillation at 80° C. at 1.33 kPa over 1 hour, 30 minutes.

A clear, pale yellow oil was obtained, wherein 96.8% of the alcohol functional group to form the chain sequences which were not differentiated by ¹H NMR at 360 MHz:

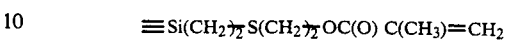

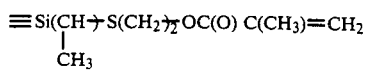

Refractive index: η_D²³°: 1.5083.

(1c): Synthesis of tetramethylcyclotetrasiloxane of mixed functionalization:

The operations carried out were the same as in Example (1b) except that 46.88 g of the compound produced in Example (1a), 0.5036 g of hydroquinone, 100.40 g of methyl methacrylate and 0.3095 g of dibutyltin oxide were charged simultaneously.

After 23 hours of reaction at 110° and after removal of the excess methyl methacrylate, a ¹H NMR characterization of the oily residue determined the chain

| | |
|---|---|
| 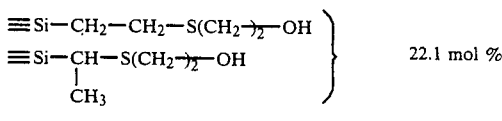 | 22.1 mol % |
| 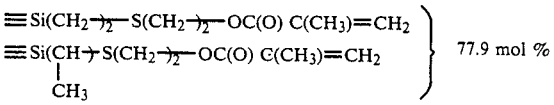 | 77.9 mol % |

EXAMPLE 2

(2a): Synthesis of the disiloxane of the formula:

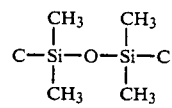

wherein C is as defined in Example 1, from vinylated M₂ of the formula:

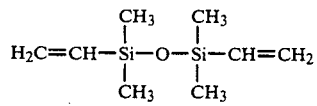

The procedures of Example (1a) were repeated, except that 111.76 g of vinylated M₂, 121.80 g of mercaptoalkanol and 0.5019 g of ABIBN were used, charged in five portions at different intervals over the reaction period.

After 18 hours of reaction, the degree of conversion of the vinyl groups was quantitative. After removal of the excess mercaptoalkanol, a ¹H NMR characterization of the oily residue, golden-yellow in color, determined the following chain sequences:

| | |
|---|---|
| ≡Si—CH₂—CH₂—S(CH₂)₂—OH | 93.4 mol % |
| ≡Si—CH—S(CH₂)₂—OH<br>     \|<br>     CH₃ | 6.6 mol % |

Refractive index: $\eta_D^{23°}$: 1.5024.

(2b): Synthesis of the disiloxane of the formula:

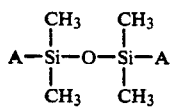

wherein A is as defined in Example 1.

The operations carried out were exactly the same as in Example (1b), except that 58.68 g of the compound produced in Example (2a), 121.05 g of methyl methacrylate, 0.9585 g of hydroquinone and 0.3761 g of dibutyltin oxide were used.

After 23 hours of reaction and after removal of the excess methyl methacrylate, a clear, golden-yellow oil was obtained, wherein all of the alcohol functional groups were esterified to methacrylic ester.

Refractive index: $\eta_D^{23°}$: 1.4928.

EXAMPLE 3

Synthesis of a dimethylpolysiloxane of the average formula:

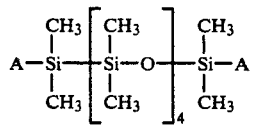

wherein A is as defined in Example 1.

10.03 g of product prepared in Example (2b) and 85.30 g of octamethylcyclotetrasiloxane were charged into a three-necked round-bottom flask equipped with mechanical stirring and under a stream of nitrogen.

When the temperature of 60° C. was reached by heating the reaction medium, 56 μl of trifluoromethane sulfonic acid were added.

After 30 hours of heating at 60° C., the fluid was neutralized with Na₂CO₃.

After filtration, the cyclic compounds of low molecular weight were removed by heating to 100° C. at 0.8 kPa for 1 hour in the rotary evaporator.

The product obtained was a clear colorless fluid.

A $^{29}$Si NMR characterization showed the formation of a copolymer comprising α,ω-methacrylate functionality containing, on average, four dimethylsiloxy D units per molecule.

A weight average molecular weight ($\overline{Mw}$) on the order of 2,600 and a number average molecular weight ($\overline{Mn}$) of 1,400, as polystyrene equivalent for the copolymer obtained, were determined by gel permeation chromatography and by UV spectral analysis

EXAMPLE 4

Synthesis of a dimethylpolysiloxane of the average formula:

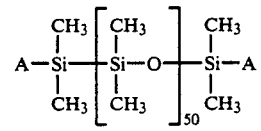

wherein A is defined as in Example 1.

10.5 g of D₄ (Me) were heated to 60° C. in a three-necked round-bottom flask equipped with mechanical stirring and under a stream of nitrogen.

When the temperature was reached, 6.74 μl of trifluoromethanesulfonic acid were added.

After 8 minutes of reaction, 1 g of the product produced in Example (2b) was charged.

After 24 hours of heating at 60° C. and after neutralization with Na₂CO₃, the clear, colorless fluid reaction mixture was characterized by gel permeation chromatography.

The weight average molecular weight ($\overline{Mw}$) of the resulting copolymer was 5,900.

The number average molecular weight ($\overline{Mn}$) was 2,400.

EXAMPLE 5

(Crosslinking by UV)

Operating procedure: A polyethylene film was coated with variable thicknesses of a composition $C_n$ based on a polymer according to the invention, containing 3% by weight of a photoinitiator, which was 2-hydroxy-2-methyl-1-phenyl-1-propanone.

The coated film was transported in air through a UV exposure station at a speed of 4.8 m/min, which corresponded to an exposure of 0.27 seconds and to an energy of 17 mJ/cm².

The UV lamp employed was a Philips ® mercury lamp, reference HOK6, fitted with an elliptical reflector, with a power output of 80 W/cm. The crosslinked layer produced was always transparent.

A composition $C_1$ containing the polymer produced in Example (1c) above was crosslinked. A crosslinked layer exhibiting a Young's modulus of 150 MPa was obtained.

A composition $C_2$ containing the polymer produced in Example (1c) and additionally containing 20% by weight of tripolylene glycol diacrylate was crosslinked.

A crosslinked layer exhibiting a Young's modulus of 230 MPa was obtained.

EXAMPLE 6

The operating procedure of Example 5 was repeated, except that:

A composition $C_3$ based on the polymer produced in Example (1b) was employed and the maximum thickness of the layer of crosslinked composition which can be obtained after a UV exposure of 0.5 seconds was determined.

This maximum thickness was 2.35 mm.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A diorganopolysiloxane comprising pendant thioalkyl (meth)acrylate functional groups and having one of the following formulae (1) or (2):

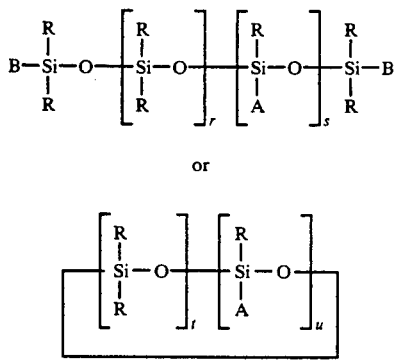

in which the symbols R, which may be identical or different, are each a $C_1$-$C_{10}$ alkyl, vinyl, phenyl or 3,3,3-trifluoropropyl radical, at least 80% of the number of the radicals R being methyl radicals; the radicals B, which may be identical or different, are each a radical R or a radical A defined below; r is an integer ranging from 0 to 200; s is an integer ranging from 0 to 50, with the proviso that, if s is 0, at least one of the two symbols B is A; u is an integer ranging from 1 to 20; t is an integer ranging from 0 to 20; t+u is equal to or greater than 3; and the symbol A is a radical having one of the formulae:

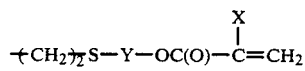

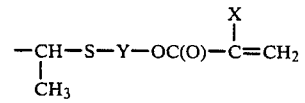

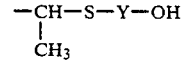

wherein X is a hydrogen atom or a methyl radical, at least one of the radicals A has the formula (3) or (4), and Y is a linear or branched chain divalent saturated aliphatic hydrocarbon radical containing from 2 to 10 carbon atoms.

2. The diorganopolysiloxane as defined by claim 1, wherein all of the radicals A have the formula (3) and/or (4).

3. The diorganopolysiloxane as defined by claim 1, wherein R is a methyl, phenyl or vinyl radical; r ranges from 0 to 20; s ranges from 2 to 15; t+u ranges from 3 to 10; X is methyl; and Y is —(CH$_2$)$_2$—.

4. The diorganopolysiloxane as defined by claim 1, having the formula (1).

5. The diorganopolysiloxane as defined by claim 1, having the formula (2).

6. The diorganopolysiloxane as defined by claim 1, in cured elastomeric state.

7. The elastomeric diorganopolysiloxane as defined by claim 6, having a refractive index higher than 1.48 and a Young's modulus higher than 100 MPa.

8. A shaped article comprising the elastomeric diorganopolysiloxane as defined by claim 6.

9. An optical fiber having a sheathing comprising the elastomeric diorganopolysiloxane as defined by claim 6.

10. A substrate having a coating on at least one face surface thereof, said coating comprising the elastomeric diorganopolysiloxane as defined by claim 6.

11. A photocurable composition of matter comprising the diorganopolysiloxane as defined by claim 1.

12. A process for the preparation of the diorganopolysiloxane as defined by claim 1, comprising first reacting a diorganopolysiloxane having one of the following formulae (7) or (8):

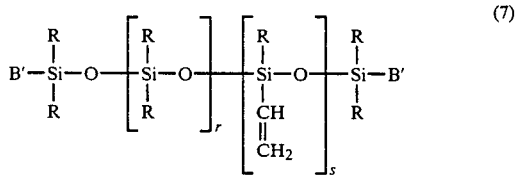

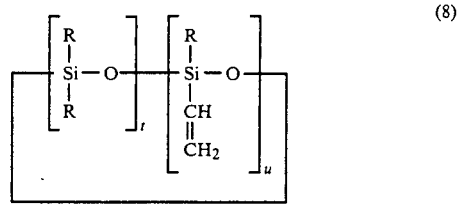

with a mercaptoalkanol of the formula HSYOH, in the presence of a free-radical generator, and then reacting the polymer containing a mercaptoalkanol functional group thus produced with an acrylic acid ester of the formula:

in which X is a hydrogen atom or a methyl radical and Z is an alkyl radical, in the presence of a catalytically effective amount of a tin compound.

* * * * *